United States Patent
Whitfill et al.

(10) Patent No.: US 8,043,997 B2
(45) Date of Patent: Oct. 25, 2011

(54) LOST CIRCULATION MATERIAL FORMULATION AND METHOD OF USE

(75) Inventors: Donald L. Whitfill, Kingwood, TX (US); Cindy C. Fang, College Station, TX (US); Matthew Miller, Spring, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 460 days.

(21) Appl. No.: 12/074,182

(22) Filed: Feb. 29, 2008

(65) Prior Publication Data

US 2009/0221452 A1  Sep. 3, 2009

(51) Int. Cl.
*C09K 8/20* (2006.01)
*C09K 8/22* (2006.01)
*C09K 8/32* (2006.01)
*C09K 8/12* (2006.01)
*C09K 8/36* (2006.01)
*C09K 8/60* (2006.01)
*C09K 8/588* (2006.01)
*C09K 8/528* (2006.01)
*E21B 43/04* (2006.01)
*A47B 43/001* (2006.01)

(52) U.S. Cl. ........ 507/104; 507/117; 507/118; 507/119; 507/204; 507/219; 507/221; 507/224; 166/278; 166/279; 166/282; 166/283; 166/284

(58) Field of Classification Search .................. 507/104, 507/117, 118, 119, 204, 219, 221, 224; 166/279, 166/281, 282, 285, 278, 283, 284
See application file for complete search history.

(56) References Cited

U.S. PATENT DOCUMENTS

| | | |
|---|---|---|
| 3,633,689 A | 1/1972 | Christman |
| 4,473,480 A | 9/1984 | Green |
| 4,830,766 A | 5/1989 | Gallup et al. |
| 4,957,174 A | 9/1990 | Whitfill et al. |
| 5,012,869 A | 5/1991 | Whitfill et al. |
| 5,180,020 A | 1/1993 | Fuh et al. |
| 5,207,282 A | 5/1993 | Fuh et al. |
| 5,401,719 A | 3/1995 | DeBeer |
| 5,458,195 A | 10/1995 | Totten et al. |
| 5,501,277 A | 3/1996 | Onan et al. |
| 5,569,324 A | 10/1996 | Totten et al. |
| 5,826,669 A | 10/1998 | Zalenski et al. |
| 6,152,227 A | 11/2000 | Lawson et al. |
| 6,518,224 B2 | 2/2003 | Wood |
| 6,825,152 B2 | 11/2004 | Green |
| 6,861,392 B2 | 3/2005 | Shaarpour |
| 6,889,766 B2 | 5/2005 | Creel et al. |
| 6,889,780 B2 | 5/2005 | Whitfill et al. |
| 6,902,002 B1 | 6/2005 | Chatterji et al. |
| 6,983,799 B2 | 1/2006 | Reddy et al. |
| 7,066,285 B2 | 6/2006 | Shaarpour |
| 7,229,492 B2 | 6/2007 | Chatterji et al. |
| 7,264,053 B2 | 9/2007 | Vargo, Jr. et al. |
| 7,284,611 B2 | 10/2007 | Reddy et al. |
| 2003/0141062 A1 | 7/2003 | Cowan et al. |
| 2004/0023815 A1 | 2/2004 | Burts, III |
| 2004/0168802 A1 | 9/2004 | Creel et al. |
| 2004/0224852 A1 | 11/2004 | Halliday et al. |
| 2004/0244978 A1 | 12/2004 | Shaarpour |
| 2005/0124502 A1 | 6/2005 | Shaarpour |
| 2005/0170973 A1 | 8/2005 | Verret |
| 2006/0084580 A1 | 4/2006 | Santra et al. |
| 2006/0086501 A1 | 4/2006 | Creel et al. |
| 2006/0094604 A1 | 5/2006 | Fang et al. |
| 2006/0096759 A1 | 5/2006 | Reddy et al. |
| 2006/0122071 A1 | 6/2006 | Reddy et al. |
| 2006/0178275 A1 | 8/2006 | Shaarpour |
| 2006/0213662 A1 | 9/2006 | Creel et al. |
| 2006/0213663 A1 | 9/2006 | Vargo, Jr. et al. |
| 2006/0217270 A1 | 9/2006 | Vargo, Jr. et al. |
| 2006/0234871 A1 | 10/2006 | Dalrymple et al. |
| 2006/0237192 A1 | 10/2006 | Shaarpour |
| 2007/0012447 A1 | 1/2007 | Fang et al. |
| 2007/0169937 A1 | 7/2007 | Allin et al. |
| 2007/0173412 A1 | 7/2007 | Allin et al. |

FOREIGN PATENT DOCUMENTS

| WO | WO 99/21933 | 5/1999 |
|---|---|---|
| WO | WO 2004/063305 A2 | 7/2004 |
| WO | WO 01/74967 A1 | 10/2004 |

OTHER PUBLICATIONS

PCT/GB2009/000427 International Search Report, mailed Jun. 2, 2009, 7 pages, including notification of transmittal of same.
PCT/GB2009/000427 Written Opinion of the International Searching Authority, mailed Jun. 2, 2009, 7 pages.
Baroid Fluid Services, Encore High Performance Isomerized Olefin (IO) Based Drilling Fluids, Halliburton Product Bulletin (2007) 2 pages.
Baroid Fluid Services, EZ MUD Shale Stabilizer, Halliburton Fluid Systems, Product Data Sheet, Sep. 5, 2006, 1 page.
Baroid Fluid Services, Clay Grabber Flocculant, Product Data Sheet, Apr. 2005, 1 page.
Baroid Fluid Services, Hydro-Guard Inhibitive Water-Based Fluid, Product Data Sheet (2006) 2 pages.
Baroid Fluid Services, Baracarb Bridging Agent, Product Data Sheet, Sep. 5, 2006, 2 pages.
Baroid Fluid Services, Barofibre Superfine Seepage Loss Additive, Product Data Sheet, Apr. 2005, 1 page.
U.S. Appl. No. 11/377,116, filed Mar. 16, 2006, Notice of Allowance and Fees Due and Notice of Allowability, mailed Jan. 30, 2008, 6 pages.
U.S. Appl. No. 11/377,116, filed Mar. 16, 2006, Office Action—Final Rejecction mailed Nov. 9, 2007, 8 pages.

(Continued)

*Primary Examiner* — Timothy J. Kugel
*Assistant Examiner* — Atnaf Admasu
(74) *Attorney, Agent, or Firm* — Craig W. Roddy; Karen B. Tripp

(57) ABSTRACT

A lost circulation material and method for well treatment employing the material that is effective at sealing or plugging small fissures and large fractures and has utility over a wide range of temperatures, including high temperatures. The material has an optimized bimodal particle distribution and optionally has a polymer flocculent or water swellable polymer.

15 Claims, No Drawings

OTHER PUBLICATIONS

U.S. Appl. No. 11/377,116, filed Mar. 16, 2006, Office Action—Final Rejection mailed Apr. 6, 2007, 9 pages.

U.S. Appl. No. 11/377,116, filed Mar. 16, 2006, Office Action—Non-Final Rejection mailed Aug. 22, 2006, 9 pages.

LYSORB (R) 218 Natural Superabsorbent product sheet, ADM North America (2007) 1 page.

LYSORB (R) 218 Natural Superabsorbent brochure, ADM, not dated, 1 page.

EZ Squeeze (R)/Case History, Turbo-CHem Intern'l , Inc., Sep. 6, 2002, www.turbochem.com/caseezsqueeze.htm (2 pages).

LYSORB (R) 281 Natural Superabsorbent, information sheet, not dated, www.admworld.com (1 page).

DIASEAL M (R) Lost Circulation Material, datasheet, not dated, www.cpchem.com/enu/pa_diaseal_m_lost_circulation_datasheet.asp (2 pages).

Barazan (R) D Viscosifer/Suspension Agent Product Data Sheet, Baroid Fluid Services, Halliburton, 2006 (1 page).

Barofibre (R) Lost Circulation and Seepage Loss Additive, product brochure, Baroid Fluid Services, Halliburton, 2007 (2 pages).

Whitfill, et al., "All Lost-Circulation Materials and Syustems Are Not Created Equal," SPE 84319, SPE Annual Tech. Conf. & Exh., Denver, CO, Oct. 5-8, 2003 (9 pages).

Fang, et al., OSPAR-Compliant Technologies for Managing Drilling-Fluid Lost-Circulation Events, SPE 94434, SPE/EPA/DOE E&P Env. Conf, Galveston, TX, Mar. 7-9, 2005 (11 pages).

Whitfill, et al., Making Economic Decisions to Mitigate Lost Circulation, SPE 95561, SPE Annual Tech. Conf. & Exh., Dallas, TX, Oct. 9-12, 2005 (11 pages).

Wang, et al., "The Key to Successfully Applying Today's Lost-Circulation Solutions," SPE 95895, SPE Annual Tech. Conf. & Exh., Dallas, TX, Oct. 9-12, 2005 (15 pages).

Whitfill, et al., "New Design Models and Materials Provide Engineered Solutions to Lost Circulation," SPE 101693, SPE Russian O & G Tech. Conf. & Exh., Russia, Oct. 3, 2006 (14 pages).

Whitfill, et al., "Preventing Lost Circulation Requires Planning Ahead," SPE 108647, Int'l Oil Conf & Exh, Mexico, Jun. 27-30, 2007 (4 pages).

Tare, et al, "DRilling Fluid Losses and Gains: Case Histories and Practical Solutions," SPE 71368, SPE Annual Tech. Conf. & Exh., New Orleans, LA, Sep. 30-Oct. 3, 2001(8 pp).

Frac-Attack (R) product brochure, not dated, http://stratacontrol.com/oldsite/products/FRAC-ATTACK.asp, accessed Apr. 3, 2008 (2pp).

Frac-Attack (R) Material Safety Data Sheet, Strata Control Services, Inc., not dated (2 pages).

EZ Squeeze (R) High Fluid Loss, High Solids, Lost Circulation Squeeze M, Turbo-Chem Intern'l, website product information, http:/www.turbochem.com/ezsqueeze.htm (2006) 5 pages.

Clay Grabber (R) Product Data Sheet, Baroid Fluid Services, Halliburton, Apr. 2005 (1 page).

Encore (R) High Performance Isomerized Olefin (IO) Based Fluid, brochure, Baroid Fluid Services, Halliburton, Aug. 2006 (2 pages).

EZ-MUD (R) Product Information Sheet, Baroid Fluid Services, 2005, (1 p) in Spanish, gen'l translation at http://www.nettechdi.com/specs/baroid/ezmud.htm, 2007(2pp) in English.

FUSE-IT (TM) Lost Circulation Treatment product brochure, Baroid Fluid Systems, Halliburton, 2006 (2 pages).

Hydro-Guard (R) Inhibitive Water-Based Fluid, product brochure, Baroid Fluid Systems, Halliburton, 2006 (2 pages).

Steelseal (R) Lost Circulation Materials product brochure, Baroid Fluid Services, Halliburton, 2007 (2 pages).

Sweep-Wate (R) Product Data Sheet, Baroid Fluid Services, Halliburton, 2007 (1 page).

LOST CIRCULATION MATERIAL FORMULATION AND METHOD OF USE

BACKGROUND OF THE INVENTION

1. Field of the Invention

The present invention pertains to methods and compositions for preventing or alleviating the loss of drilling fluids and other well servicing fluids into a subterranean formation during drilling or construction of boreholes in said formation.

2. Description of Relevant Art

In the oil and gas industry, a common problem in drilling wells or boreholes in subterranean formations is the loss of circulation (of fluids, such as drilling fluids or muds) in a well or borehole during the drilling. Such lost fluids typically go into fractures induced by excessive mud pressures, into pre-existing open fractures, or into large openings with structural strength in the formation.

A large variety of materials have been used or proposed in attempts to cure lost circulation. Generally, such materials may be divided into four types or categories: fibrous materials, such as shredded automobile tires or sawdust; flaky materials, such as wood chips and mica flakes; granular materials, such as ground nutshells; and slurries, whose strength increases with time after placement, such as hydraulic cement.

Another type of slurry that thickens downhole is made, typically, by dispersing a polyacrylamide in water and then emulsifying the dispersion in a paraffinic mineral oil, typically using a polyamine as an emulsifier. Bentonite is commonly added to such a slurry where it remains in the external or oil phase of the slurry. At normal shear rates, the bentonite rarely if at all contacts the water so the slurry remains relatively thin while being pumped down the drill pipe. At higher shear rates such as prevailing at the drill bit, the emulsion breaks and the bentonite mixes with the water. Crosslinking by the polyacrylamide results in a semi-solid mass that thickens further with the bentonite as it is pumped into cracks and fractures in the formation to block the lost circulation.

U.S. Pat. No. 7,066,285 to Mano Shaarpour provides an improved lost circulation material that comprises a blend of a resilient, angular, carbon-based material and a water-swellable, but not water-soluble, crystalline synthetic polymer. Preferred carbon-based materials comprise resilient graphite carbon particles and ungraphitized carbon particles. Preferred synthetic polymers comprise polyacrylamide, and most preferably a dehydrated crystallized form of cross-linked polyacrylamide that will readily swell following exposure to water or aqueous based fluids. The patent teaches that such swelling may be delayed by salts in the water, such as the use of brine or addition of calcium chloride.

Although many materials and compositions exist and have been proposed for preventing lost circulation, there continues to be a need for even more versatile and better compositions and methods for preventing loss of circulation.

SUMMARY OF THE INVENTION

The present invention provides a unique combination of material types and particle sizes for the treatment of lost circulation. The composition of the invention comprises a resilient graphitic carbon having an optimized or bimodal particle size distribution, and optionally a polymer enhancer, that efficiently seals both small pores (as small as about 190 microns) and large fractures (slots as large as about 500 to about 1000 microns), while showing tolerance to high temperatures (as high as about 150° F. to about 250° F.). Flocculants or swellable polymers are preferred polymers for use in the composition.

The method of the invention uses the composition of the invention in preventing or alleviating loss of drilling fluid or other fluid circulation in a wellbore penetrating a subterranean formation. In the method, the composition is preferably provided in a weighted or unweighted "pill" for introduction into the wellbore. Such "pills" typically comprise the composition blended with a small amount of drilling fluid or brine. The amount of the composition used in the pill will depend on the size of the subterranean fracture, opening, or lost circulation zone to be treated. Multiple pills or treatments may be used if needed. Preferably drilling is stopped while the pill comprising the composition of the invention is introduced into and circulated in the wellbore. The composition of the invention will enter lost circulation zones or porous or fractured portions of the formation where it will prevent or retard the entry of drilling and other wellbore fluids. Pressure can be used to squeeze the pill into the lost circulation zone. Alternatively, the composition may be added to the drilling fluid and circulated with the drilling fluid during drilling or servicing of the well.

DETAILED DESCRIPTION OF PREFERRED EMBODIMENTS

According to the prevent invention, an improved lost circulation material (LCM) may be obtained by combining several materials to obtain a composition that has a "bimodal" particle distribution and tolerance to high temperatures. The "bimodal" particle distribution provides sealing of small pores (as small as 190 microns) as well as large fissures (such as 500 to 1000 micron slots). The bimodal particle distribution is obtained by an optimized design of particle types. Adding or coupling a polymer flocculant or a swellable polymer with the composition may extend the utility or enhance the effectiveness of the composition at high temperatures as will be discussed further below.

The optimized design of the particle types is obtained by adding together the following components: a finely ground fibrous cellulosic material, such as BAROFIBRE® SF material available from Halliburton Energy Services, Inc. in Houston, Tex. and Duncan, Okla., preferably about 35 micron d50, preferably grade "super fine", and preferably about 5% to about 15% of the composition; resilient graphitic carbon (RGC), such as STEELSEAL® material available from Halliburton Energy Services, Inc. in Houston, Tex. and Duncan, Okla., preferably about 1150 micron d50, preferably about 5% to about 15% of the composition; ground rubber or a biodegradable material such as, for example, ground walnut shells, preferably about 10-30 mesh, preferably about 5% to about 25% of the composition; and diatomaceous earth, preferably about 25 micron d50, preferably about 55% to about 75% of the composition. Ground walnut shells may provide further advantages by being ground into different or bimodal sizes, that is, large or larger and small or smaller sizes, such as, for example, about 410-420 micron d50 (small) and about 1100-1200 micron d50 (large). The dimension d50 (or d10) means that 50% by volume of the particles are smaller than the value indicated.

Table 1 below demonstrates a bimodal particle size distribution for an example preferred composition of the invention in more detail:

TABLE 1

Bimodal Particle Size Distribution (microns)

| | Fibrous cellulosic material | Diatomaceous earth | Resilient graphitic carbon | Ground rubber |
|---|---|---|---|---|
| MODE 1 | | | | |
| D10 | 5 | 4 | | |
| D50 | 40 | 26 | | |
| D90 | 180 | 311 | | |

TABLE 1-continued

Bimodal Particle Size Distribution (microns)

|  | Fibrous cellulosic material | Diatomaceous earth | Resilient graphitic carbon | Ground rubber |
|---|---|---|---|---|
| MODE 2 |  |  |  |  |
| D10 |  |  | 450 | 720 |
| D50 |  |  | 1150 | 1270 |
| D90 |  |  | 1830 | 1835 |

Table 2 below provides data showing that this formulation of Table 1 is effective as a lost circulation material (LCM) for both large pores and fractures. The data is from particle plugging testing on fritted disks and slot testing on steel disks, both at 1000 psi differential in 1.25 ppb BARAZAN® D dispersion-enhanced xanthan biopolymer water fluid. Testing in this simple water fluid is preferred to testing in a more complex field mud as the water fluid will not contribute to stopping the lost circulation in the test.

TABLE 2

| Test Medium | Temperature °F. | Spurt Loss ml or *grams | PPT Value ml | Static Filtration Rate, ml |
|---|---|---|---|---|
| 190 micron disk | 150 | 68 | 76 | 1.46 |
| 508 micron slot | 150 | 6.6* | NA | NA |
| 1016 micron slot | 150 | 33.8* | NA | NA |
| 190 micron disk | 250 | 88 | 112 | 4.38 |
| 508 micron slot | 250 | 16.4* | NA | NA |
| 1016 micron slot | 250 | 28.5* | NA | NA |

The unique character of the bimodal formulation of the composition of the present invention is demonstrated in the following experimental data. Among other things, this data compares similar sizes and types of particulate materials. To facilitate the differentiation between differing formulations, a Normalized Particle Plugging Test (NPPT) equation was developed to generate a single number for comparison. The logic of the NPPT is as follows: (1) an initial high Spurt Loss (SL) is desired for a high fluid loss squeeze; (2) the LCM is desired to quickly plug so as not to continue propagating a fracture by transmission of the LCM fluid and pressure to the fracture tip; and (3) to accomplish point (2), an efficient shut-off of fluid flow is desired that results in a low number for the static filtration rate (SFR). All together, the NPPT is expressed as follows: NPPT=(PPT Value/SL)*SFR. The NPPT value is useful for comparing samples in a single test sequence. The NPPT value may not be valid for comparing values between different test series. That is, there is not a specific or ideal NPPT value that is indicative of commercial utility, although generally lower NPPT values indicate better lost circulation materials.

The Particle Plugging Tests (PPTs) were conducted with a 190 micron ceramic disk, 0.25 inches thick, and having an average pore size of 190 microns. The Slot Tests were conducted in a similar apparatus as the Particle Plugging Tests, but the ceramic disk was replaced by a metal disk with a slot of the designated size cut through it. With the smaller pore ceramic size disk, a slower fluid loss could be obtained such that a spurt loss, PPT value and Static Filtration Rate could be calculated if one did not have the total loss of material within the 30 minute test interval. The slot tests measured an almost instantaneous fluid loss before the slot plugged, for a successful test. If the slot did not plug immediately, all of the fluid in the test cell would have been lost and the test would have been a failure.

Tables 3-11 demonstrate the laboratory screening associated with arriving at lost circulation materials that show promise for field use. These tables also allow comparison of preferred lost circulation materials formulated according to the present invention with other lost circulation materials or potential lost circulation materials having one or more similar components as the fluids of the present invention. Table 12 provides test data for a preferred formulation of the present invention, as described above.

In the tables below, the following abbreviations have the meanings indicated below. GSX refers to ground rubber or a ground rubber product and GSR is a polyvulcanized ground rubber product. DE refers to diatomaceous earth. DE* is a pseudonym for a commercially available diatomaceous earth (not bimodal) lost circulation material. BDF 391 is resilient graphitic carbon sized 1100-1150 micron d50 and BDF 393 is resilient graphitic carbon sized 700-750 micron d50. BARAZAN® D PLUS product is a high molecular weight polysaccharide biopolymer. BAROFIBRE® SF product is a non-toxic fibrous cellulosic material. STEELSEAL® product is a resilient graphitic carbon. BARACARB® product is a sized calcium carbonate or ground marble material. HYDRO-GUARD® drilling fluid is a water based drilling fluid. ENCORE® drilling fluid is an invert emulsion based drilling fluid. CLAY-GRABBER® flocculant is a non-ionic, high molecular weight polyacrylamide polymer. EZ-MUD® flocculant is a liquid polymer emulsion containing partially hydrolyzed polyacrylamide/polyacrylate (PHPA) copolymer. All trademarked products are available from Halliburton Energy Services, Inc. in Houston, Tex. and Duncan, Okla.

TABLE 3

Formulations of Various Fluids

| Sample Mark | | | | | | | | | | | | | | | | | | |
|---|---|---|---|---|---|---|---|---|---|---|---|---|---|---|---|---|---|---|
|  | J | J-A | J-8 | J8-1 | J8-2 | J-9 | J9-1 | J9-2 | J-13 | J13-1 | J13-2 | J-14 | J14-1 | E-2-1 | H-4 | H-4SS | H-5 | H-5SS | T-1200 |
| Water, bbls. | 1 | 1 | 1 | 1 | 1 | 1 | 1 | 1 | 1 | 1 | 1 | 1 | 1 |  | 1 | 1 | 1 | 1 | 1 |
| BARAZAN ® D PLUS, lbs. | 1 | 1 | 1 | 1 | 1 | 1 | 1 | 1 | 1 | 1 | 1 | 1 | 1 |  | 1 | 1 | 1 | 1 | 1 |
| BAROFIBRE ® SF, lbs. | 5 | 5 | 5 | 5 |  | 5 | 5 |  |  |  |  |  |  |  |  |  |  |  |  |
| SG 3712 | 5 |  | 5 |  | 5 |  |  |  |  |  |  |  |  |  |  |  |  |  |  |
| Grape Pomace - Fine |  |  |  | 5 |  | 5 | 5 | 5 | 5 |  |  |  |  |  |  |  |  |  |  |
| MN-84 DE diatomaceous earth |  | 35 | 35 | 35 |  |  |  |  | 15 | 15 | 15 |  |  |  |  |  |  |  |  |

TABLE 3-continued

Formulations of Various Fluids

| Sample Mark | J | J-A | J-8 | J8-1 | J8-2 | J-9 | J9-1 | J9-2 | J-13 | J13-1 | J13-2 | J-14 | J14-1 | E-2-1 | H-4 | H-4SS | H-5 | H-5SS | T-1200 |
|---|---|---|---|---|---|---|---|---|---|---|---|---|---|---|---|---|---|---|---|
| calcium carbonate, 7μ | | | | | | 35 | 35 | 35 | | | | 20 | | | | | | | |
| calcium carbonate, 3μ | | | | | | | | | 20 | 20 | | | | | | | | | |
| GSX 40 | | | 5 | 5 | 5 | | 5 | 5 | | 5 | 5 | | | | | | | | |
| GSR 10/30 | | | 5 | 5 | 5 | 5 | 5 | 5 | 5 | 5 | 5 | | | | | | | | |
| Polyvulc GSX-500 | | | | | | | | 5 | | | | | | | | | | | |
| GSX-812 | | | | | | | | | | | | | 50 | | | | | | |
| Commercial LCM DE* (not bimodal) | | | | | | | | | | | | | 50 | | | | | | |
| BDF 391 RGC | | | | | | | | | | | | | | 30 | 28.5 | 28.5 | 11.4 | 11.4 | 7 |
| BDF 393 RGC | | | | | | | | | | | | | | 6 | 11.4 | | 28.5 | | |
| STEELSEAL ® | | 5 | | | | | | | | | | | | 6 | | 11.4 | | 28.5 | 14 |
| STEELSEAL ® Fine | | | | | | | | | | | | | | 6 | | | | | |
| BARACARB ® 600 | 8 | 8 | | | | | | | | | | | | 6 | 17.1 | 17.1 | 17.1 | 17.1 | 18 |
| BARACARB ® 150 | 16 | 16 | | | | | | | | | | | | 6 | | | | | |
| Ground Marble 1200 | | | | | | | | | | | | | | | | | | | 18 |
| BARACARB ® 50 | 12 | 12 | | | | | | | | | | | | | | | | | |
| BARACARB ® 2300 | 4 | 4 | | | | | | | | | | | | | | | | | |

TABLE 4

Particle Plugging Test (190 micron disk, 150° F., 1000 psi)

| TEST | J | J-A | J-8 | J8-1 | J8-2 | J-9 | J9-1 | J9-2 | J-13 |
|---|---|---|---|---|---|---|---|---|---|
| 10 sec, mL | 15 | 20 pressure at 350 psi | 2 pressure drops | 2 pressure drops | 10 | 15 | 2 pressure drops | 20 | 1 |
| 1 min, mL | 30 | 43 | 5 | 30 regain pressure to 1000 psi | 18 | 40 | 20 | 30 | 30 |
| 7.5 min, mL ($V_{7.5}$) | 80 stop | 55 | 30 pressure back to 1000 psi | 31 | 21 pressure to 1000 psi | 85 stop | 65 stop | 60 | 45 pressure at 300 psi |
| 15 min, mL | | 60 pressure dropped to 100 psi, | 35 | 31 | 23 | | | 70 | 55 |
| 25 min, mL | | 61 | 36 | 31 | 23 | | | 72 | 57 |
| 30 min, mL ($V_{30}$) | | 63 | 36 | 31 | 23 | | | total loss | 57 |
| PPT value, mL ($2 \times V_{30}$) | >160 | 126 | 72 | 62 | 46 | >170 | >130 | 144 | 114 |
| Spurt loss, mL ($2 \times (V_{7.5} - (V_{30} - V_{7.5}))$) | N/A | 94 | 48 | 62 | 38 | N/A | N/A | 96 | 66 |
| Static Filtration Rate, mL ($2 \times (V_{30} - V_{7.5}))/2.739$ | N/A | 5.84 | 4.38 | 0 | 1.46 | N/A | N/A | 8.76 | 8.76 |
| NPPT | N/A | 7.83 | 3.29 | 0.00 | 0.88 | N/A | N/A | 13.14 | 15.13 |

TABLE 4-continued

Particle Plugging Test (190 micron disk, 150° F., 1000 psi)

| | Sample Mark | | | | | | | | | |
|---|---|---|---|---|---|---|---|---|---|---|
| TEST | J13-1 | J13-2 | J-14 | J14-1 | E-2-1 | H-4 | H-4SS | H-5 | H-5SS | T-1200 |
| 10 sec, mL | 6 | 7 pressure at 500 psi | 10 | 45 | 25 | 3 | 10 | 10 | 8 | 5 |
| 1 min, mL | 25 pressure hold only to 300 psi | 11 | 50 | 85 | 40 | 30 | 40 | 30 | 35 | 30 |
| 7.5 min, mL ($V_{7.5}$) | 30 | 16 | 75 stop | 85 stop. Total loss | 60 | 48 | 65 | 47 | 55 | 85 |
| 15 min, mL | 34 | 21 | | | 65 | 82 stop | 70 | 78 stop | 65 | stop |
| 25 min, mL | 34 | 22 | | | 68 | | 70 | | 68 | N/A |
| 30 min, mL ($V_{30}$) | 35 | 25 | | | 70 can't regain pressure through out | | 70 can't regain pressure | | 69 can't regain pressure through out | N/A |
| PPT value, mL (2 × $V_{30}$) | 70 | 50 | >150 | | 140 | >164 | >140 | >156 | 138 | >170 |
| Spurt loss, mL (2 × ($V_{7.5}$ − ($V_{30}$ − $V_{7.5}$)) | 50 | 14 | N/A | | 100 | N/A | N/A | N/A | 82 | N/A |
| Static Filtration Rate, mL (2 × ($V_{30}$ − $V_{7.5}$))/2.739 | 3.65 | 6.57 | N/A | | 7.3 | N/A | N/A | N/A | 10.22 | N/A |
| NPPT | 5.11 | 23.46 | N/A | | 10.22 | N/A | N/A | N/A | 17.20 | N/A |

TABLE 5

Slot Sealing Test (150° F., 1000 psi)

| TEST/Sample Mark | 0.020" (508 μm), filtrate, g | 0.040" (1016 μm), filtrate, g |
|---|---|---|
| J-8 | 18.72 | 97 (total loss, the slot was partially clog with GSR 10/30 polyvulc) |
| J-8-1 | 13.49 | 93 (total loss, the slot was partially clog with GSR 10/30 polyvulc) |
| J-8-2 | 19.35 | 104.9 (total loss, the slot was partially clog with GSR 10/30 polyvulc) |
| J-13-1 | 19.26 | 84.99 (total loss, the slot was partially clog with GSR 10/30 polyvulc) |
| J-14-1 (DE*-Commercial diatomaceous earth LCM, not bimodal) 50 ppb | 6.97 | 48.48 (total loss, the slot was not sealed. All liquid came out and left behind gel solids in the cell) |
| E-2-1 | 59.93 (all liquid came out, only some solids left) | 88.43 (total loss) |
| H-5SS | 89.9 (total loss) | 70.0 (total loss) |

TABLE 6

Formulation Data

| | Sample Mark | | | | | | |
|---|---|---|---|---|---|---|---|
| | J-8-1 | J-8-1-S | J-8-1-SS | J-8-1-SSS | J-8-1-SSSS | J8-2 | J-8-2-S |
| Water, bbls. | 1 | 1 | 1 | 1 | 1 | 1 | 1 |
| BARAZAN ® D PLUS, lbs. | 1.5 | 1.5 | 1.5 | 1.5 | 1.5 | 1.5 | 1.5 |
| BAROFIBRE ® SF, lbs. | 5 | 5 | 3 | 5 | 5 | — | — |
| Grape Pomace - Fine, lbs | — | — | — | — | — | 5 | 5 |
| MN-84 DE, lbs | 35 | 35 | 35 | 35 | 35 | 35 | 35 |

TABLE 6-continued

Formulation Data

| | Sample Mark | | | | | | |
|---|---|---|---|---|---|---|---|
| | J-8-1 | J-8-1-S | J-8-1-SS | J-8-1-SSS | J-8-1-SSSS | J8-2 | J-8-2-S |
| GSX 40, lbs | 5 | — | — | — | — | 5 | — |
| GSR 10/30 Polyvulc, lbs | 5 | 5 | 7 | 5 | 5 | 5 | 5 |
| BDF-391, lbs | — | 5 | 5 | 5 | 5 | — | 5 |
| BDF-400, lbs | — | — | — | 2.5 (active) | 5.0 (active) | — | — |

TABLE 7

Particle Plugging Test (190 micron disk, 150° F., 1000 psi)

| | TEST | | | | | | | | | |
|---|---|---|---|---|---|---|---|---|---|---|
| Sample Mark | 10 sec, mL | 1 min, mL | 7.5 min, mL (V7.5) | 15 min, mL | 25 min, mL | 30 min, mL (V30) | PPT value, mL (2 × V30) | Spurt loss, mL | Static Filtration Rate, mL | NPPT |
| J-8-1 | 2 | 30 | 31 | 31 | 31 | 31 | 62 | 62 | 0.00 | 0.00 |
| J-8-1-S | 8 | 27 | 36 | 38 | 38 | 38 | 76 | 68 | 1.46 | 1.63 |
| J-8-1-SS | 11 | 31 | 38 | 43 | 49 | 50 | 100 | 52 | 8.76 | 16.85 |
| J-8-1-SSS | 13 | 36 | 50 | 55 | 60 | 60 | 120 | 80 | 0.62 | 0.93 |
| J-8-1-SSSS | 10 | 41 | 60 | 65 | 70 | 73 | 146 | 94 | 9.49 | 14.73 |
| J-8-2 | 10 | 18 | 21 | 23 | 23 | 23 | 46 | 38 | 1.46 | 0.88 |
| J-8-2-S | 5 | 27 | 36 | 39 | 42 | 44 | 88 | 56 | 5.84 | 9.18 |
| J14-1 (DE*) (50 ppb) | 8 | 25 | 35 | 38 | 42 | 45 | 90 | 50 | 7.3 | 13.14 |
| J-8-1-S @ 250 F. | 45 | 130 (total loss) | N/A | N/A | N/A | N/A | N/A | N/A | N/A | N/A |
| J-8-1-S w/ HYDRO-GUARD ® | 1 | 5 | 10 | 12 | 12 | 12 | 24 | 16 | 1.46 | 2.19 |
| J-8-1-S w/ lignosulfonate | 5 | 12 | 17 | 22 | 28 | 28 | 56 | 12 | 8.03 | 37.47 |
| J-8-1-S w/ ENCORE ® | 0.5 | 0.5 | 0.5 | 0.5 | 0.5 | 0.5 | 1.0 | 1.0 | 0.0 | 0.0 |
| J14-1(DE*) (50 ppb) | 45 | 85 | 85 (total loss) | N/A | N/A | N/A | N/A | N/A | N/A | N/A |
| DE* (80 ppb) | 32 | 76 | 79 (total loss) | N/A | N/A | N/A | N/A | N/A | N/A | N/A |
| DE* (80 ppb) @250 F. | 40 | 86 | 103 (total loss) | N/A | N/A | N/A | N/A | N/A | N/A | N/A |

Spurt loss = [2 × (V7.5 − (V30 − V7.5)], mL
Static Filtration Rate = [2 × (V30 − V7.5)]/2.739, mL
NPPT = (PPT V/SL) * SFR

TABLE 8

Slot Sealing Test (150° F., 1000 psi)

| TEST/ Sample Mark | 0.020" (508 μm), filtrate, g | 0.040" (1016 μm), filtrate, g |
|---|---|---|
| J-8-1 | 13.49 | 93 (total loss, partially clog with GSR 10/30 polyvulc) |
| J-8-1-S | 6.57 | 33.85 |
| J-8-1-SS | 19.68 | 35.68 |
| J-8-1-SSS | 7.2 | 36.63 |
| J-8-2 | 19.35 | 104.9 (total loss, partially clog with GSR 10/30 polyvulc) |
| J-8-2-S | 12.45 | 20.75 |
| J-14-1 (DE*) (50 ppb) | 6.97 | 48.48 (total loss, the slot was not sealed. All liquid came out and left behind gel solids in the cell) |
| J-8-1-S @ 250 F. | 62 (total loss) | 81.7 (total loss) |
| J-8-1-S with lignosulfonate | 14.87 | 42.42 |
| J-8-1-S with HYDRO-GUARD ® | 4.68 | 6.69 |
| J-8-1-S with ENCORE ® | 3.44 | 43.51 |
| DE* (80 ppb) | 8.07 | 33.49 |
| DE* (80 ppb) @ 250 F. | 11.58 | 64 (total loss) |

TABLE 9

Particle Plugging Test (190 micron disk, 150° F., 1000 psi)

TEST

| Sample Mark | 10 sec, mL | 1 min, mL | 7.5 min, mL (V7.5) | 15 min, mL | 25 min, mL | 30 min, mL (V30) | PPT value, mL (2 × V30) | Spurt loss, mL | Static Filtration Rate, mL | NPPT |
|---|---|---|---|---|---|---|---|---|---|---|
| J-8-1-S | 8 | 27 | 36 | 38 | 38 | 38 | 76 | 68 | 1.46 | 1.63 |
| J-8-1-S @ 250° F. | 45 | 130 (total loss) | N/A | N/A | N/A | N/A | N/A | N/A | N/A | N/A |
| J-8-1-S w/ HYDRO-GUARD ® | 1 | 5 | 10 | 12 | 12 | 12 | 24 | 16 | 1.46 | 2.19 |
| J-8-1-S w/ lingo-sulfonate | 5 | 12 | 17 | 22 | 28 | 28 | 56 | 12 | 8.03 | 37.47 |
| J-8-1-S w/ ENCORE ® | 0.5 | 0.5 | 0.5 | 0.5 | 0.5 | 0.5 | 1.0 | 1.0 | 0.0 | 0.0 |
| J14-1(DE*) (50 ppb) | 45 | 85 | 85 (total loss) | N/A | N/A | N/A | N/A | N/A | N/A | N/A |
| DE* (80 ppb) | 32 | 76 | 79 (total loss) | N/A | N/A | N/A | N/A | N/A | N/A | N/A |
| DE* (80 ppb) @250° F. | 40 | 86 | 103 (total loss) | N/A | N/A | N/A | N/A | N/A | N/A | N/A |

Spurt loss = [2 × (V7.5 − (V30 − V7.5)], mL
Static Filtration Rate = [2 × (V30 − V7.5)]/2.739, mL
NPPT = (PPT V/SL) * SFR

TABLE 10

Slot Sealing Test (250° F., 1000 psi)

| Sample Mark | 0.020" (508 μm), filtrate, g | 0.040" (1016 μm), filtrate, g |
|---|---|---|
| J-8-1-S @ 250 F. | 62 (total loss) | 81.7 (total loss) |
| J-8-1-S with CLAY-GRABBER ® (0.5 lb active) @ 250 F. | 7.61 | 40 |
| J-8-1-S with EZ-MUD ® (0.5 lb active) @ 250 F. | 5.7 | 51 |
| DE* (80 ppb) @ 250 F. | 11.58 | 64 (total loss) |
| DE* (80 ppb) @ 250 F. (repeat for the 2nd time) | 15 | 61 (total loss) |

TABLE 11

Particle Plugging Test (190 micron disk, 250° F., 1000 psi)

TEST

| Sample Mark | 10 sec, mL | 1 min, mL | 7.5 min, mL (V7.5) | 15 min, mL | 25 min, mL | 30 min, mL (V30) | PPT value, mL (2 × V30) | Spurt loss, mL | Static Filtration Rate, mL | NPPT |
|---|---|---|---|---|---|---|---|---|---|---|
| J-8-1-S @250 F. | 45 | 130 (total loss) | N/A | N/A | N/A | N/A | N/A | N/A | N/A | N/A |
| J-8-1-S w/ CLAY GRABBER ® (0.5 lb active) @ 250 F. | 20 | 50 | 75 | 76 | 86 | 89 | 178 | 122 | 10.22 | 14.9 |
| J-8-1-S w/ EZ-MUD ® (0.5 lb active) @ 250° F. | 10 | 70 | 73 | 81 | 84 | 92 | 184 | 108 | 13.87 | 23.63 |

TABLE 11-continued

Particle Plugging Test (190 micron disk, 250° F., 1000 psi)

TEST

| Sample Mark | 10 sec, mL | 1 min, mL | 7.5 min, mL (V7.5) | 15 min, mL | 25 min, mL | 30 min, mL (V30) | PPT value, mL (2 × V30) | Spurt loss, mL | Static Filtration Rate, mL | NPPT |
|---|---|---|---|---|---|---|---|---|---|---|
| DE* (80 ppb) @250° F. | 40 | 86 | 103 (total loss) | N/A | N/A | N/A | N/A | N/A | N/A | N/A |

Spurt loss = [2 × (V7.5 − (V30 − V7.5)], mL
Static Filtration Rate = [2 × (V30 − V7.5)]/2.739, mL
NPPT = (PPT V/SL) * SFR Addition of polymer to the composition of the invention enhances the effectiveness of the composition of the invention as a lost circulation material at higher temperatures. This "polymer enhancement" is demonstrated by the data below.

TABLE 12

High Fluid Loss Squeeze (HFLS) Formulation of the Invention With and Without Polymer Enhancement (PE)

| Fluid | Test Medium | Temp. ° F. | Spurt Loss ml or *grams | PPT Value ml | Static Filtration Rate, ml | NPPT |
|---|---|---|---|---|---|---|
| HFLS w/o PE | 190 micron disk | 150 | 68 | 76 | 1.5 | 1.7 |
| HFLS w/o PE | 190 micron disk | 250 | 130 in 1.0 min | Total loss | NA | NA |
| HFLS w/o PE | 508 micron slot | 150 | *6.6 | NA | NA | |
| HFLS w/o PE | 1016 micron slot | 150 | *33.9 | NA | NA | |
| HFLS w/o PE | 508 micron clot | 250 | Total loss | NA | NA | |
| HFLS w/o PE | 1016 micron Slot | 250 | Total loss | NA | NA | |
| HFLS w/CG | 190 micron disk | 250 | 88.0 | 112 | 4.4 | 5.6 |
| HFLS w/CG | 508 micron disk | 250 | 16.5 | NA | NA | |
| HFLS w/CG | 1016 micron slot | 250 | 28.5 | NA | NA | |
| HFLS w/EZM | 190 micron disk | 250 | 108.0 | 184 | 13.9 | 23.7 |
| HFLS w/EZM | 508 micron slot | 250 | Did not run | NA | NA | |
| HFLS w/EZM | 1016 micron slot | 250 | 47.0 | NA | NA | |

CG = 0.5 ppb CLAY GRABBER ™ high molecular weight non-ionic polymer;
EZM = 1.0 ppb
EZ MUD ® synthetic polymer containing partially hydrolyzed polyacrylamide/polyacrylate (PHPA) copolymer. Both CLAY GRABBER ™ and EZ MUD ® are available from Halliburton Energy Services, Inc. in Houston, Texas and Duncan, Oklahoma.

For field use, the composition of the present invention may be mixed and sacked for addition as 1 sack per barrel (50 lbs) in water containing 1.0 ppb BARAZAN® xanthan biopolymer suspending agent or equivalent suspending agent. Such un-weighted pill is optimum for high fluid loss squeeze applications. However, the treatment pill can be weighted with BAROID or other weighting material, when necessary. For increased efficiency in lost circulation applications, weighting with SWEEP-WATE® selectively sized barite is preferred due to its larger particle size distribution for enhancing the ability of the composition to plug fractures. SWEEP-WATE® material is available from Halliburton Energy Services, Inc. in Houston, Tex. and Duncan, Okla. If a high fluid loss squeeze is not desired, the composition of the invention can be applied by adding it directly to the drilling fluid system, preferably in the amount of 1-sack per barrel.

Table 13 below shows data for slot tests with a composition of the invention in 12.0 ppg drilling fluids, rather than in the water fluid used for initial screening.

TABLE 13

| DRILLING FLUID | TEMPERATURE | 508 Micron Slot, g | 1016 Micron Slot, g |
|---|---|---|---|
| Dispersed | 150 | 14.9 | 42.4 |
| Dispersed | 250 | 23.5 | 43.0 |
| Non-Dispersed | 150 | 4.7 | 67.7 |
| Non-Dispersed | 250 | 10.4 | 42.6 |

TABLE 13-continued

| DRILLING FLUID | TEMPERATURE | 508 Micron Slot, g | 1016 Micron Slot, g |
|---|---|---|---|
| Synthetic Base Fluid | 150 | 3.4 | 43.5 |
| Synthetic Base Fluid | 250 | 7.9 | 35.0 |

Impermeable formations and vugular and large natural fractures can present special problems for lost circulation control during drilling. The present invention is nevertheless effective for alleviating lost circulation under such conditions when a swelling polymer enhancer or flocculent is added to the composition, or to the drilling fluid containing the composition, of the invention. Suitable swelling polymer enhancers include, for example, DIAMOND SEAL® polymer which is a water swellable but not water soluble crystalline synthetic polymer capable of absorbing hundreds of times its own weight in water, FUSE-IT® material, and LYSORB® 218 polymer which is a natural superabsorbent polymer, all available from Halliburton Energy Services, Inc. in Houston, Tex. and Duncan, Okla. Suitable flocculants are EZ-MUD® flocculant and CLAY GRABBER® flocculent, also available from Halliburton Energy Services, Inc. as noted above. Most preferably, such enhancer is added immediately prior to pumping the pill containing the composition of the invention into the wellbore for entry into the subterranean formation.

Tables 14 and 15 provide data for slot tests and particle plugging tests respectively using a 1.25 ppb of the composition of the invention mixed with water, which may or may not contain BARAZAN® dispersion-enhanced xanthan biopolymer for viscosity and suspension, and to which various concentrations of swelling polymer have been added.

While improvements in the tolerance of the composition at high temperatures (subterranean temperatures of or in excess of 220° F.) can be obtained by adding a polymer to the composition, such as LYSORB® swelling polymer or CLAY GRABBER® flocculent, care should be taken not to overtreat the composition. That is, when using CLAY GRABBER® flocculant, about 0.25 to 2.0 ppb (active) CLAY GRABBER® flocculant is preferred, and when using LYSORB® 218 polymer, about 0.5 to 5 ppb of LYSORB® 218 polymer is preferred. Further, use of either LYSORB® 218 polymer or CLAY GRABBER® flocculant is preferred, not a combination of both swelling polymer and flocculent, with the composition of the invention. Also, a higher quantity of the composition of the invention, that is for example, 80 ppm vs 50 ppb, is preferred in treating lost circulation.

According to the method of the invention, the composition of the invention is used as a lost circulation material. That is, a pill or plug comprising the composition of the invention is introduced into the wellbore and allowed to circulate through the wellbore at least to the zone needing lost circulation treatment or to the zone where lost circulation is believed to likely occur. The composition of the invention is then allowed to enter such zone. Such zone may be or may comprise or include, without limitation, fractures and porous formations. In such zone, the composition of the invention reduces, eliminates or prevents the entry of drilling fluid and/or other well fluids into said zone. Alternatively, the composition of the invention is added directly to the drilling fluid system rather than in a pill, and allowed to circulation with the drilling fluid for entry into lost circulation zones.

The foregoing description of the invention is intended to be a description of preferred embodiments. Various changes in the details of the described composition and method can be

TABLE 14

| Drilling Fluid | Swelling Polymer Enhancer | Concentration ppb | Temperature | 508 Micron Slot, g | 1016 Micron Slot, g |
|---|---|---|---|---|---|
| BARAZAN® biopolymer, 1.25 ppb water fluid | LYSORB® 218 polymer | 5.0 | 250 | 10.3 | 27.6 |
| 1.25 ppb water fluid | DIAMOND SEAL® polymer | 2.0 | 250 | 10.5 | 24.6 |
| 1.25 ppb water fluid | FUSE-IT® polymer | 2.0 | 250 | 10.8 | 22.0 |

TABLE 15

| Drilling Fluid | Swelling Polymer Enhancer | Conc. Ppb | Temp. | Spurt Loss | PPT Value | Static Filtration Rate | NPPT |
|---|---|---|---|---|---|---|---|
| BARAZAN® biopolymer, 1.25 ppb water fluid | LYSORB® 218 polymer | 5.0 | 250 | 34.0 | 34.0 | 0 | 0 |
| 1.25 ppb water fluid | DIAMOND SEAL® polymer | 2.0 | 250 | 17.5 | 130.0 | 11.0 | 81.3 |
| 1.25 ppb water fluid | FUSE-IT® polymer | 2.0 | 250 | 52.0 | 68.0 | 2.9 | 3.8 |

What is claimed is:

1. A method for avoiding or reducing lost circulation in a subterranean formation during drilling a borehole in said formation, the method comprising:
   treating the subterranean formation with a lost circulation material or composition comprising:
   particles having a particle distribution including particles for plugging micron pores as small as about 190 microns and particles for plugging fractures ranging from about 500 to about 1000 microns;
   and wherein the lost circulation material comprises:
   about 5% to about 15% fibrous cellulosic material;
   about 5% to about 15% resilient graphitic carbon;
   about 5% to about 15% ground rubber or ground walnut shells; and
   about 55% to about 75% diatomaceous earth;
   and enhancing the tolerance of the lost circulation material to temperatures above about 150° F. to about 250° F. by adding a polymer to said lost circulation material.

2. The method of claim 1 wherein the polymer in the lost circulation material is a flocculant.

3. The method of claim 1 wherein the polymer is a water swelling polymer.

4. The method of claim 3 wherein the polymer is not water-soluble.

5. The method of claim 1 wherein the polymer in the lost circulation material comprises a non-ionic polyacrylamide or an acrylate.

6. The method of claim 1 wherein the polymer is a crystalline synthetic polymer having the ability to absorb hundreds of times its own weight of aqueous fluid.

7. The method of claim 1 wherein the walnut shells are ground into large and small sizes.

8. A drilling fluid comprising a lost circulation material comprising:
   cellulosic material;
   resilient graphitic carbon;
   ground rubber or ground walnut shells; and
   diatomaceous earth; and
   a water swelling polymer or flocculant comprising a polyacrylamide or acrylate;
   wherein the lost circulation material has a bimodal particle size distribution such that it includes particles for plugging micron pores as small as about 190 microns and particles for plugging fractures ranging from about 500 to about 1000 microns; and
   wherein the lost circulation material is capable of plugging said pores at temperatures in the range of about 150° F. to about 250° F.

9. A lost circulation material comprising:
   about 10% fibrous cellulosic material;
   about 10% resilient graphitic carbon;
   about 10% to about 20% 10-30 mesh ground rubber or ground walnut shells; and
   about 60% to about 70% diatomaceous earth.

10. The lost circulation material of claim 9 having a bimodal particle distribution including particles for plugging micron pores as small as about 190 microns and particles for plugging fractures ranging from about 500 to about 1000 microns.

11. The lost circulation material of claim 9 further comprising a polymer in a quantity sufficient to enhance the ability of the material to plug micron pores as small as about 190 microns and micron pores ranging from about 500 to about 1000 microns at temperatures in the range of about 220° F. to about 250° F.

12. The lost circulation material of claim 11 wherein said polymer is a water swelling polymer or flocculant.

13. The lost circulation material of claim 9 having about 10% small ground walnut shells and about 10% large ground walnut shells.

14. The lost circulation material of claim 13 having about 60% 25 micron d50 diatomaceous earth.

15. The lost circulation material of claim 14 wherein the resilient graphitic carbon is sized 1150 micron d50.

* * * * *